US012595637B2

(12) United States Patent
Den Hoed et al.

(10) Patent No.: US 12,595,637 B2
(45) Date of Patent: Apr. 7, 2026

(54) PIPE LAYER ATTACHMENT FOR AN EXCAVATOR

(71) Applicant: Volvo Construction Equipment AB, Eskilstuna (SE)

(72) Inventors: Tony Den Hoed, Carlisle, PA (US); John W. Duff, Fort Myers, FL (US); Matthew Wahler, Shippensburg, PA (US); Michal Perdek, Chambersburg, PA (US); Lars-Inge Larsson, Schweich (DE)

(73) Assignee: Volvo Construction Equipment AB, Eskilstuna (SE)

( * ) Notice: Subject to any disclaimer, the term of this patent is extended or adjusted under 35 U.S.C. 154(b) by 1944 days.

(21) Appl. No.: 16/479,419

(22) PCT Filed: Jan. 31, 2017

(86) PCT No.: PCT/US2017/015745
§ 371 (c)(1),
(2) Date: Jul. 19, 2019

(87) PCT Pub. No.: WO2018/143915
PCT Pub. Date: Aug. 9, 2018

(65) Prior Publication Data
US 2019/0357422 A1 Nov. 28, 2019

(51) Int. Cl.
*E02F 3/96* (2006.01)
*B66C 23/36* (2006.01)
(Continued)

(52) U.S. Cl.
CPC ............... *E02F 3/96* (2013.01); *B66C 23/36* (2013.01); *E02F 3/38* (2013.01); *B66C 23/64* (2013.01); *E02F 7/04* (2013.01); *F16L 1/065* (2013.01)

(58) Field of Classification Search
CPC .......... B66C 13/14; B66C 23/36; E02F 33/34; E02F 33/03; E02F 33/369; E02F 3/96; E02F 3/38; F16L 1/065
See application file for complete search history.

(56) References Cited

U.S. PATENT DOCUMENTS 1,509,295 A 9/1924 Holcomb et al.
2,580,471 A * 1/1952 Smith ....................... E02F 3/30
414/694
(Continued)

FOREIGN PATENT DOCUMENTS

CN 2171636 Y 7/1994
CN 203668984 U 6/2014
(Continued)

OTHER PUBLICATIONS

Chinese First Office Action mailed Feb. 1, 2021 for Chinese Patent Application No. 201780084687.3, 11 pages (including English translation).
(Continued)

*Primary Examiner* — Christopher J Sebesta
(74) *Attorney, Agent, or Firm* — Sage Patent Group

(57) ABSTRACT

A pipe layer attachment for an excavator includes a winch configured to wind and unwind a cable having a hook attached thereto. The pipe layer attachment also includes a pipe layer boom configured to mount onto a boom of the excavator as a cantilever with the pipe layer boom extending beyond an end of the boom. The pipe layer boom is configured to be connected to an arm attachment pin connection of the boom and an arm cylinder pin connection of the boom.

7 Claims, 4 Drawing Sheets

(51) Int. Cl.

| | |
|---|---|
| *E02F 3/38* | (2006.01) |
| *B66C 23/64* | (2006.01) |
| *E02F 7/04* | (2006.01) |
| *F16L 1/06* | (2006.01) |

(56) References Cited

U.S. PATENT DOCUMENTS

| | | | | |
|---|---|---|---|---|
| 2,630,231 | A * | 3/1953 | Klinge ...................... | E02F 3/96 |
| | | | | 212/177 |
| 3,043,442 | A * | 7/1962 | Wirkkala ................. | B66C 3/20 |
| | | | | 212/168 |
| 3,447,368 | A | 6/1969 | Daly | |
| 3,465,904 | A * | 9/1969 | Pietro ...................... | E02F 3/38 |
| | | | | 414/718 |
| 3,524,560 | A * | 8/1970 | Hall ........................ | B66C 13/18 |
| | | | | 212/181 |
| 3,874,532 | A * | 4/1975 | Metailler ................ | E02F 3/301 |
| | | | | 37/403 |
| 4,293,269 | A * | 10/1981 | Zook ..................... | E02F 9/2016 |
| | | | | 212/347 |
| 4,405,281 | A | 9/1983 | Ruttershoff | |
| 4,523,684 | A * | 6/1985 | Baisden ................. | B66C 23/04 |
| | | | | 212/175 |
| 6,003,252 | A * | 12/1999 | Davis ...................... | B66C 23/42 |
| | | | | 37/403 |
| 6,045,320 | A | 4/2000 | Cullen | |
| 8,152,412 | B2 | 4/2012 | Davis | |
| 10,731,319 | B2 * | 8/2020 | Bull ........................ | E21B 15/00 |
| 2006/0239809 | A1 * | 10/2006 | DeSilvio ................. | E02F 3/06 |
| | | | | 414/680 |
| 2009/0260265 | A1 | 10/2009 | Aeschbacher et al. | |
| 2016/0319513 | A1 * | 11/2016 | Chen ........................ | E02F 9/12 |

FOREIGN PATENT DOCUMENTS

| | | | |
|---|---|---|---|
| CN | 204551558 | U | 8/2015 |
| CN | 205529718 | U | 8/2016 |
| IT | PC20120015 | | 11/2013 |
| JP | 662268432 | A | 11/1987 |
| JP | S637427 | A | 1/1988 |
| JP | H0995965 | A | 4/1997 |
| KR | 20130090675 | A1 | 8/2013 |
| KR | 20130095837 | A | 8/2013 |
| WO | WO 9403389 | A1 | 2/1994 |

OTHER PUBLICATIONS

Extended European Search Report mailed Sep. 15, 2020 for European Patent Application No. 17895333.7, 9 pages.

Chinese Second Office Action dated Jul. 20, 2021 for Chinese Patent Application No. 201780084687.3, 8 pages (including English translation).

International Search Report and Written Opinion of the International Searching Authority, PCT/US2017/015745 mailed Apr. 25, 2017, 7 pages.

* cited by examiner

PIPE LAYER ATTACHMENT FOR AN EXCAVATOR

CROSS REFERENCE TO RELATED APPLICATIONS

This application is a 35 U.S.C. § 371 national stage application of PCT International Application No. PCT/US2017/015745 filed on Jan. 31, 2017, the disclosure and content of which is incorporated by reference herein in its entirety.

FIELD OF DISCLOSURE

The present disclosure relates to construction equipment. More particularly, the present disclosure relates to construction equipment configured for use in laying pipe or similar tasks involving lifting.

BACKGROUND

Oil and gas pipeline contractors require construction equipment that provides maneuverability and multiple pipe placement possibilities. Examples of construction equipment include excavators and pipe layers. Excavators must traverse across difficult terrain as they are used for site preparation and to form trenches. Rotatable excavators allow the bucket to position itself 360 degrees around the undercarriage. Some pipe layers have fixed non-rotatable booms and are used to lift and place pipe sections within the preformed trench. Pipe layers are designed move laterally along the trench to place pipe sections adjacent one another.

In one form, equipment for laying pipe is currently available as a dedicated pipe layer. By being designed with the expressly intended use of laying pipe, dedicated pipe layers can be designed with booms having a length of about nine meters or more, while maintaining stability to lift 5,000 kgs or more.

A growing need exists for versatile machines that allow contractors to reduce equipment purchases and conserve resources. For example, pipe laying equipment is sometimes provided in the form of a side-boom attachment. Construction vehicles such as back hoes or wheel loaders have been fit with a side-boom attachment pipe laying equipment. These side-boom attachments generally have booms that are about 5 meters or less in length to limit the potential for tip over. These shorter booms and resulting shorter reach limit the effectiveness of these solutions.

A need remains for improved equipment suitable for laying pipe that combines the benefits of a dedicated pipe layer with the benefits of an attachment.

SUMMARY

Embodiments of the present disclosure include a pipe layer attachment for an excavator. The pipe layer attachment includes a winch configured to wind and unwind a cable having a hook attached thereto. The pipe layer attachment also includes a pipe layer boom configured to mount onto a boom of the excavator as a cantilever with the pipe layer boom extending beyond an end of the boom. The pipe layer boom is configured to be connected to an arm attachment pin connection of the boom and an arm cylinder pin connection of the boom.

Other embodiments of the present disclosure include pipe layers. The pipe layers include an undercarriage, an upper structure rotatable relative to the undercarriage, and a boom pivotably attached to the upper structure, the boom comprising a first pin connection adjacent to a distal end of the boom opposite the upper structure, and a second pin connection along the boom. A pipe layer boom is attached to the boom at the first pin connection and the second pin connection with the pipe layer boom cantilevered beyond the distal end of the boom. The pipe layer boom supports a sheave at an end thereof, and a winch is configured to wind and unwind a cable passing over the sheave, the cable having a hook attached thereto.

Yet additional embodiments provide methods of retrofitting an excavator having a boom pivotably attached to an upper structure, an arm mounted to a distal end of the boom at an arm attachment pin connection, a bucket attached to the arm, an arm cylinder mounted to the boom at an arm cylinder attachment pin connection, and a hydraulic fluid supply line attached to the arm cylinder. The methods include receiving the excavator with the bucket, arm, and arm cylinder removed. The method further comprises attaching a pipe layer boom to the boom at the arm attachment pin connection and at the arm cylinder attachment pin connection. The pipe layer boom is attached to the boom as a cantilever extending beyond the distal end of the boom.

These and other aspects of the present disclosure will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention, Other embodiments, and modifications and improvements of the described embodiments, will occur to those skilled in the art and all such other embodiments, modifications and improvements are within the scope of the present invention. Features from one embodiment or aspect can be combined with features from any other embodiment or aspect in any appropriate combination. For example, any individual or collective features of method aspects or embodiments can be applied to apparatus, product or component aspects or embodiments and vice versa.

Figure 1:
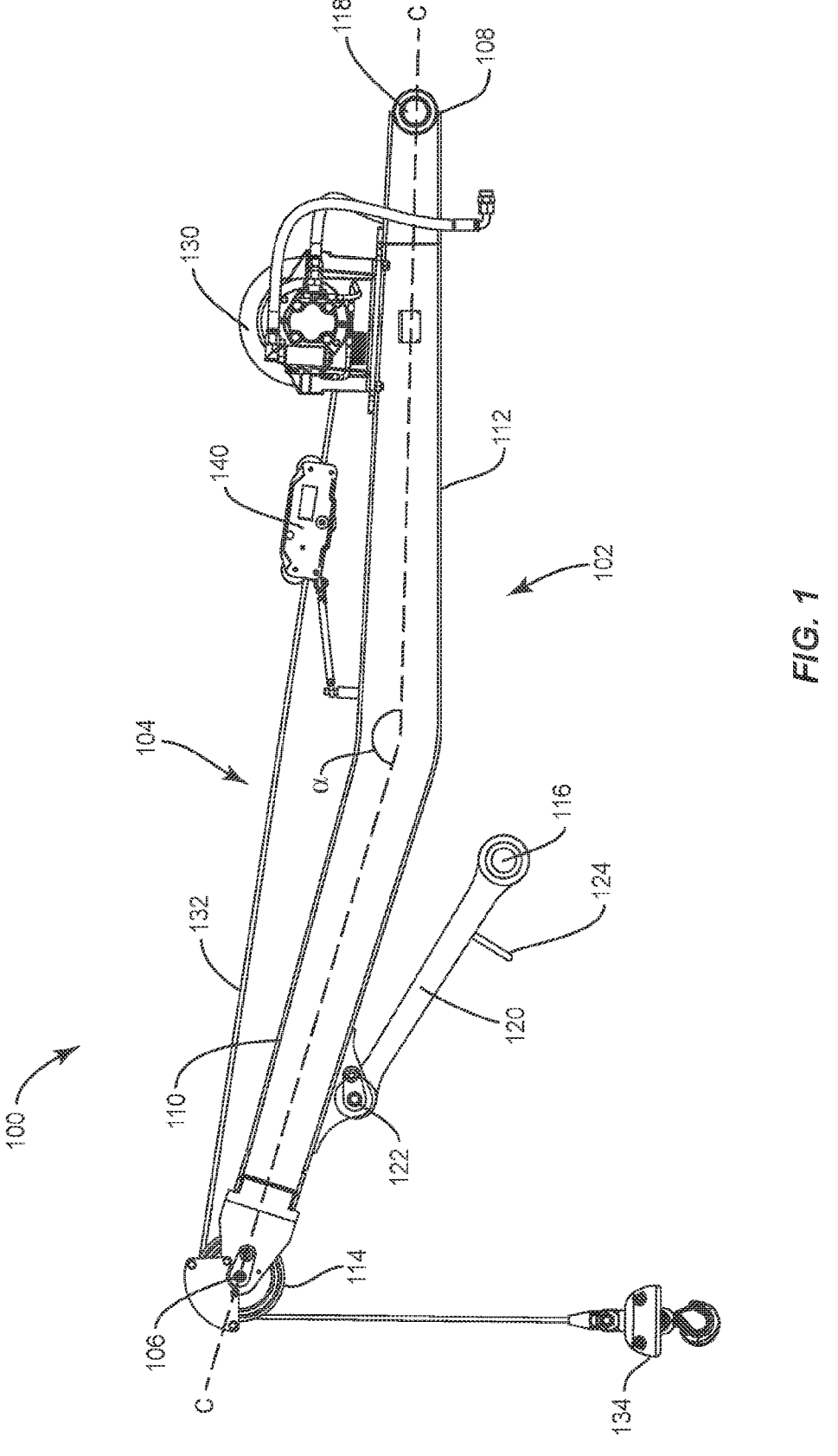
FIG. 1 shows a pipe layer attachment according to embodiments of the present disclosure.

As shown in FIG. 1, a pipe layer attachment 100 is shown. The pipe layer attachment 100 includes a pipe layer boom 102 and a lifting system 104. The pipe layer boom 102 has a first distal end 106 and a second distal end 108. An imaginary centerline C can pass through the pipe layer boom 102 from the first distal end 106 to the second distal end 108. In the illustrated embodiment, the centerline C is non-linear. In the present embodiment, the pipe layer boom 102 has an extension 110 adjacent to the first distal end 106 and a base 112 adjacent to the second distal end 108. An obtuse angle α, is formed on the centerline C where the extension 110 meets the base 112.

The first distal end 106 of the pipe layer boom 102 can support a sheave 114 rotatably attached thereto.

In the embodiment shown, the pipe layer boom 102 includes two mounting points 116, 118. In this embodiment, the mounting points 116, 118 are apertures configured to receive pins for creating joints. In the illustrated example of FIG. 1, the first mounting point 116 is formed at the end of a linkage 120 pivotably attached to the extension 110 of the pipe layer boom 102 at a hinge joint 122. The linkage 120 can include a bracket 124 along the length thereof. Instead of using the linkage 120 that allows the first mounting point 116 to move relative to the centerline C, in other embodiments, the first mounting point can be fixed in relation to the centerline.

In the illustrated embodiment of FIG. 1, the second mounting point 118 is an aperture near the second distal end 108 of the pipe layer boom 102. In other embodiments, the second mounting point 118 can be spaced from the second distal end 108. In other embodiments, the second mounting point 118 can be provided as part of bracket (not shown) attached to the base 112 of the pipe layer boom 102.

The lifting system 104 facilitates lifting of a pipe section. The lifting system 104 shown in FIG. 1 includes a winch 130. In one embodiment, the winch 130 is attached to the pipe layer boom 102. In other embodiments, the winch 130 can be separate from the pipe layer boom 102. In an embodiment, the winch 130 is a hydraulically driven winch. In other embodiments, the winch 130 can be electric.

The lifting system 104 can also include a cable 132 for being wound and unwound around the winch 130. As shown in the embodiment of FIG. 1, the cable 132 passes over the sheave 114. A hook 134 attaches to the cable 132 to lift and lower objects, such as pipes, as the cable 132 is being wound or unwound. The hook 134 can attach to the bracket 124, which may form a loop, of the linkage 120 when storing or transporting the pipe layer attachment 100. As known in the art, a load moment indicator (LMI), such as a line rider 140, can be applied to the cable 132. The LMI can transmit wirelessly to a display to notify the operator if the load on the hook 134 approaches a weight limit setting.

Figure 2A:
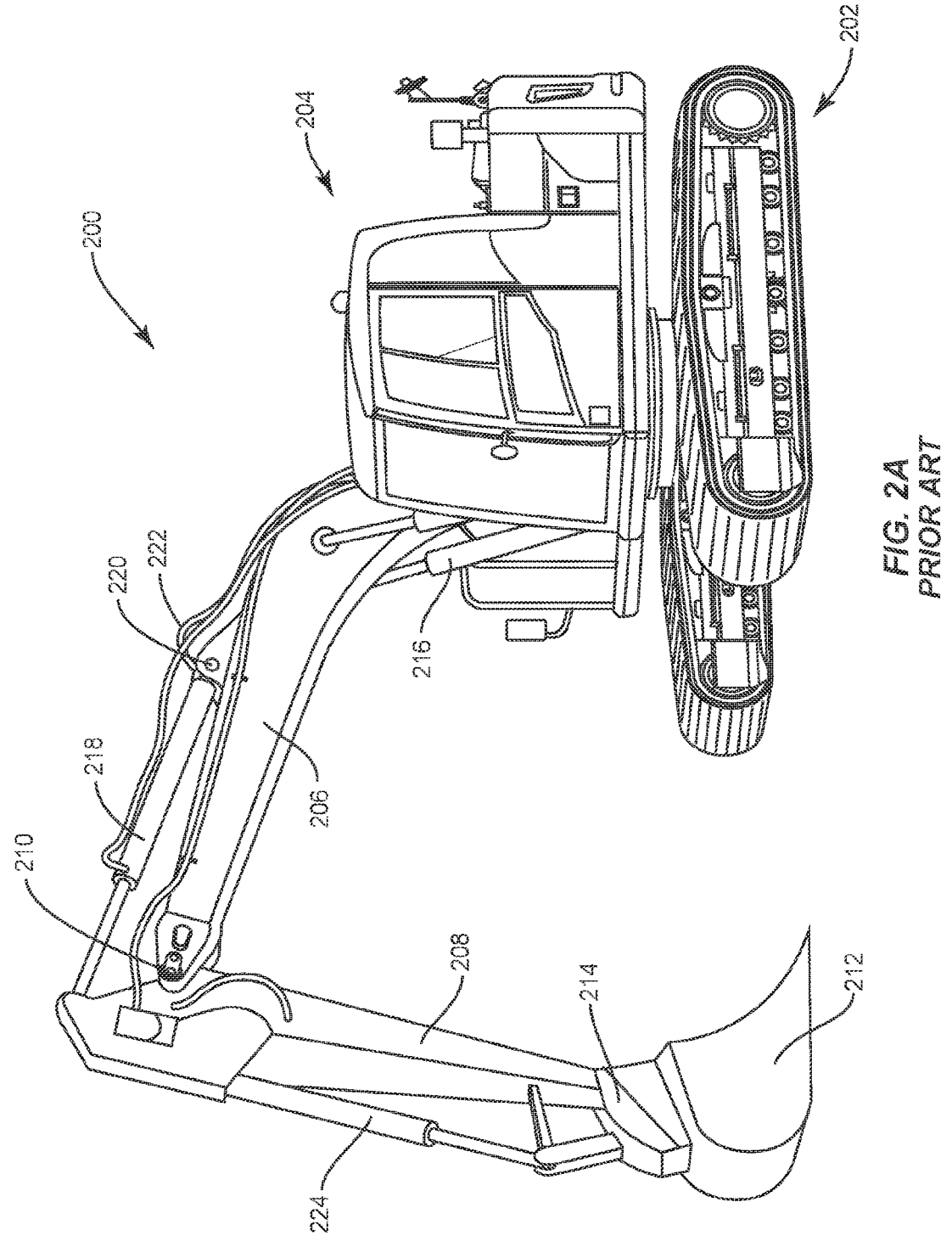
FIGS. 2A-2C show a process for retrofitting an excavator with a pipe layer attachment according to embodiments of the present disclosure.

According to embodiments of the present disclosure, the pipe layer attachment 100 is intended for retrofitting an excavator for use in laying pipe. Turning to FIG. 2A, an excavator 200 is shown that is suitable for conversion according to the present disclosure. The excavator 200 includes an undercarriage 202. The excavator 200 also includes an upper structure 204, such as a cab and engine room, capable of being rotated on top of the undercarriage 202. The excavator 200 further comprises a boom 206 pivotably mounted to the upper structure 204. An arm 208 is pivotably attached to the boom 206 by an arm attachment pin connection 210. A bucket 212 is pivotably attached to the arm 208 by a bucket attachment pin connection 214. A boom cylinder 216 is used to rotate the boom 206 relative to the upper structure 204. An arm cylinder 218 is used to rotate the arm 208 relative to the boom 206. The arm cylinder 218 is attached to the boom 206 at an arm cylinder attachment pin connection 220. In one embodiment, the arm cylinder 218 is driven by fluid from a hydraulic fluid line 222. Further, a bucket cylinder 224 is used to rotate the bucket 212 relative to the arm 208.

Figure 2B:
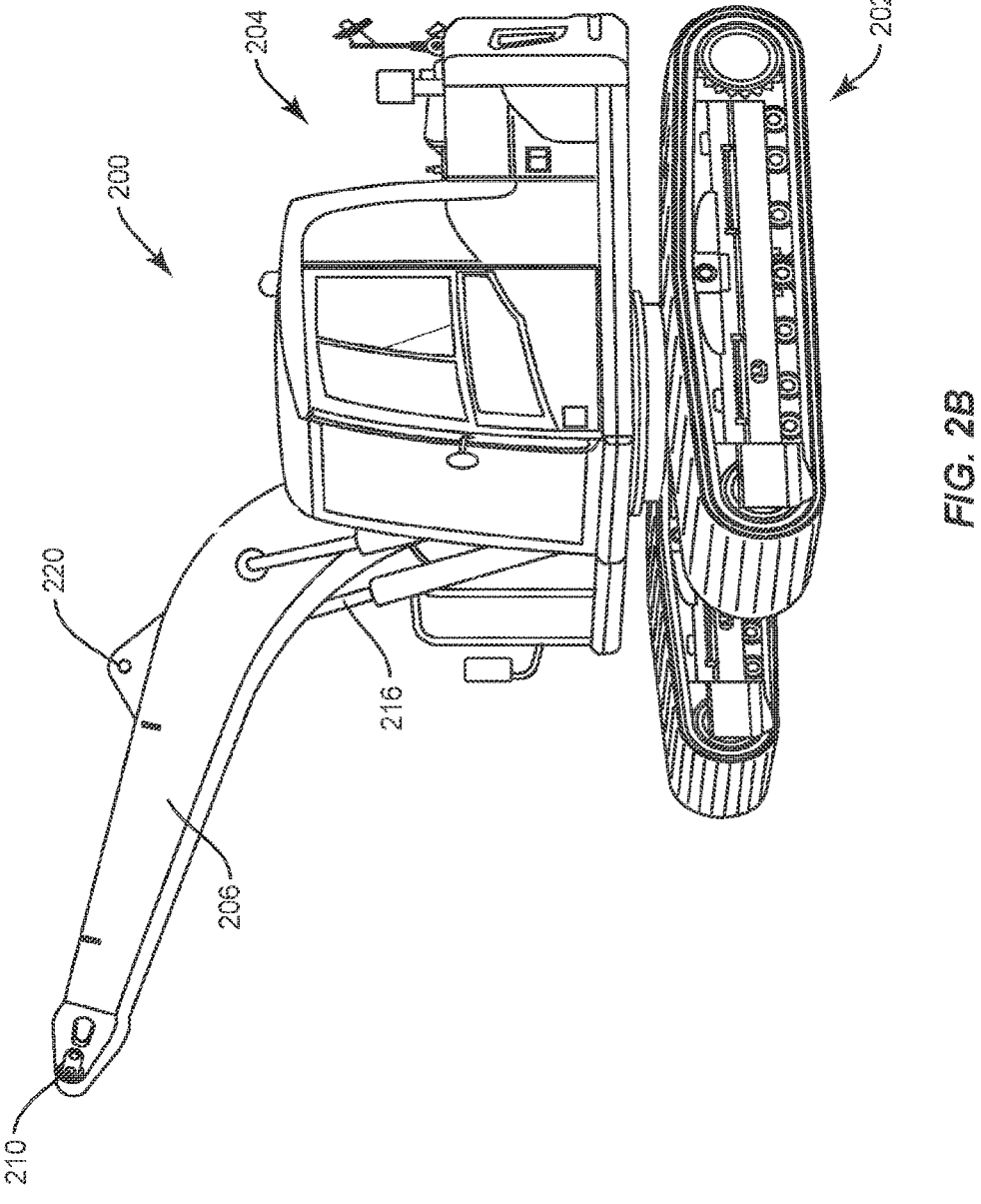

FIG. 2B shows the excavator 200 in a form suitable for receiving the pipe layer attachment 100. As seen in FIG. 2B, the excavator 200 has retained the boom 206 with the arm attachment pin connection 210 and the arm cylinder attachment pin connection 220. The arm, bucket, arm cylinder, and bucket cylinder have all been removed.

Figure 2C:
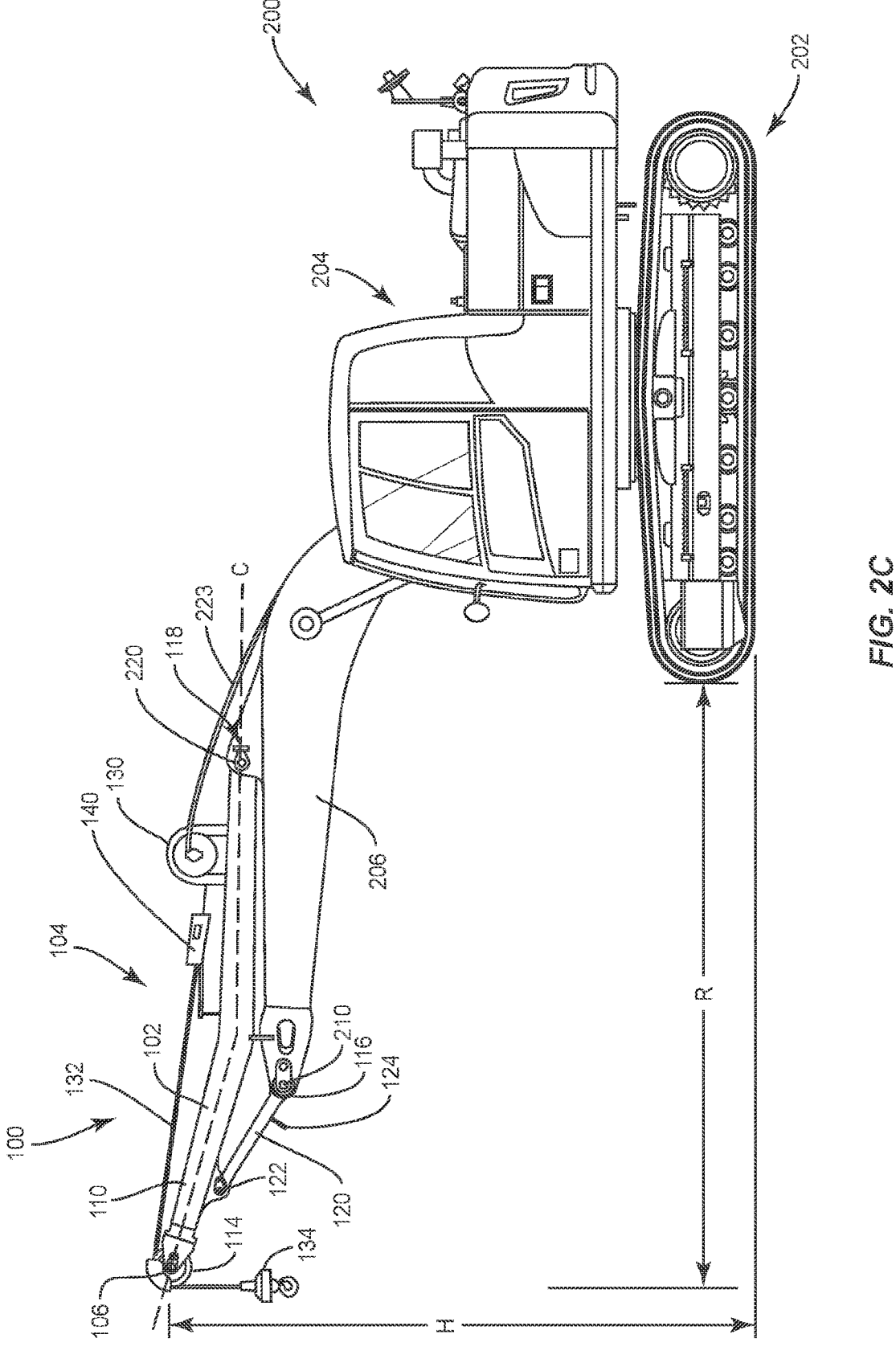

FIG. 2C shows the pipe layer attachment 100 mounted to the boom 206 of the excavator 200 and transforming the excavator into a rotating pipe layer. The first mounting point 116 of the pipe layer boom 102 is joined to the boom 206 of the excavator 200 with the arm attachment pin connection 210. Similarly, the second mounting point 118 of the pipe layer boom 102 is joined to the boom 206 of the excavator 200 with the arm cylinder attachment pin connection 220. By providing the first mounting point 116 on the linkage 120, the ability to adjust the relative positioning between the first mounting point 116 and the second mounting point 118 can increase the attachment tolerance between the pipe layer attachment 100 and the boom 206. In the present embodiment, the pipe layer attachment 100 is fixed to the boom 206 and not pivotable with respect to the boom. In the present embodiment, pivoting the boom 206 relative to the upper structure 204 moves the pipe layer attachment 100 relative to the upper structure.

According to one embodiment, operation of the winch 130 of the pipe layer attachment 100 is facilitated by connecting a hydraulic fluid line 223 to the winch. The hydraulic fluid line 223 may connect to auxiliary hydraulics incorporated into the excavator that allow for independent operation of the boom 206 and the winch 130.

When mounted on the boom 206, the pipe layer boom 102 is configured as a cantilever with the extension 110 reaching beyond the arm attachment pin connection 210 of the boom, extending the reach R of the hook 134 relative to the undercarriage 202. In one embodiment, the reach R ranges front about four meters to about ten meters. Further, due to the shape of the centerline C in the illustrated embodiment, the sheave 114 is positioned higher above the ground than the arm attachment pin connection 210, increasing the maximum height H of the hook 134. In one embodiment the maximum height ranges from about three and a half meters to about six meters.

As used herein, "cantilever" refers to the use of a generally rigid structural element, such as the pipe layer boom 102 in this embodiment, that has at least one distal end that is unsupported. In the embodiment shown, distal end 106 is unsupported, and the structural support is provided by attachment points 116 and 118.

The pipe layer attachment 100 of the illustrated embodiment provides several advantages over alternative methods of using an excavator for laying pipe. Particularly, the pipe layer attachment 100 makes use of the pre-existing arm attachment pin connection 210 and the pre-existing arm cylinder attachment pin connection 220 as attachment locations between the boom 206 of the excavator 200 and the pipe layer boom 102. Use of these preexisting connection points facilitates an easy and economical conversion process that does not require permanently modifying existing excavator components. By avoiding permanent modifications to existing excavator components, the excavator 200 can be returned to its original functionality.

Although the above disclosure has been presented in the context of exemplary embodiments, it is to be understood that modifications and variations can be utilized without departing from the spirit and scope of the invention, as those skilled in the art will readily understand. Such modifications and variations are considered to be within the purview and scope of the appended claims and their equivalents.

The invention claimed is:

1. A method of retrofitting an excavator, wherein the excavator has an excavator boom pivotably attached to an excavator upper structure so that a distal end of the excavator boom is opposite the upper structure, an excavator boom cylinder used to rotate the excavator boom relative to the upper structure, an excavator arm mounted to the distal end of the excavator boom at an excavator arm attachment pin connection, an excavator bucket attached to the arm, and an excavator arm cylinder mounted to the excavator boom at an excavator arm cylinder attachment pin connection, the method comprising:

receiving the excavator with the excavator bucket, arm, and arm cylinder removed; and attaching a pipe layer boom to the excavator boom at the excavator arm attachment pin connection and at the excavator arm cylinder attachment pin connection of the excavator boom so that:

the pipe layer boom is mounted onto the excavator boom as a cantilever;

an extension of the pipe layer boom extends beyond the distal end of the excavator boom;

the pipe layer boom is fixed to the excavator boom, whereby the pipe layer is not pivotable with respect to the excavator boom and so that pivoting the excavator boom relative to the upper structure moves the pipe layer boom relative to the upper structure; and providing a winch configured to wind and unwind a cable having a hook attached thereto.

2. The method of claim 1, wherein the pipe layer boom supports a sheave at a distal end thereof, the method further comprising passing a cable from the winch over the sheave.

3. The method of claim 1, wherein attaching the pipe layer boom at the arm attachment pin connection comprises attaching a linkage between the arm attachment pin connection and the pipe layer boom.

4. The method of claim 1, wherein the pipe layer boom comprises at least one mounting point, the at least one mounting point is an aperture.

5. The method of claim 1, wherein the pipe layer boom comprises a base and the extension, the extension forming an obtuse angle with respect to the base.

6. The method of claim 1, wherein the pipe layer boom supports a sheave at a distal end thereof.

7. The method of claim 1, further comprising the cable, the hook and a load moment indicator for attachment to the cable.

* * * * *